United States Patent
Kanerva

[11] Patent Number: 6,030,025
[45] Date of Patent: Feb. 29, 2000

[54] PIVOT MECHANISM FOR MOTOR CAR DOORS

[75] Inventor: Pentti Kanerva, Angered, Sweden

[73] Assignees: Filepost Limited, Bedfordshire, United Kingdom; Pentti Design, Angered, Sweden

[21] Appl. No.: 09/091,224

[22] PCT Filed: Jan. 8, 1997

[86] PCT No.: PCT/SE97/00014

§ 371 Date: Jul. 8, 1998

§ 102(e) Date: Jul. 8, 1998

[87] PCT Pub. No.: WO97/25505

PCT Pub. Date: Jul. 17, 1997

[30] Foreign Application Priority Data

Jan. 8, 1996 [SE] Sweden .................................. 9600052

[51] Int. Cl.[7] ....................................................... B60J 5/04
[52] U.S. Cl. ........................................ 296/146.12; 49/248
[58] Field of Search .......................... 296/146.11, 146.12, 296/185, 202; 49/248, 246, 385

[56] References Cited

U.S. PATENT DOCUMENTS

| 3,093,406 | 6/1963 | Barenyi | 296/146.12 X |
| 3,095,600 | 7/1963 | Bretzner | 49/248 X |
| 3,275,370 | 9/1966 | Smith | 49/248 X |

FOREIGN PATENT DOCUMENTS

| 0125703 A2 | 11/1984 | European Pat. Off. . | |
| 0126438 A2 | 11/1984 | European Pat. Off. . | |
| 1198222 | 8/1965 | Germany | 296/146.11 |
| 3341922 | 6/1985 | Germany | 296/146.11 |
| 902405 | 8/1962 | United Kingdom . | |
| 493225 | 7/1992 | United Kingdom | 296/146.11 |

*Primary Examiner*—D. Glenn Dayoan
*Assistant Examiner*—Chad D Wells
*Attorney, Agent, or Firm*—Flehr Hohbach Test Albritton & Herbert LLP; Richard E. Backus

[57] ABSTRACT

Pivot mechanism with pivotable arms for motor car doors, and of the kind, where the door can expose the entire door opening for stepping-in and stepping-out and the movement of the door outwards from the side of the car body is minimized thus that distance between door (2) and car (1) is as little as possible, whereby the mechanism has two supporting arms (3,3'), which are each pivotally supported about hinges (6, 6') provided in the car door and each at their other end are pivotable about hinges (4, 4') provided in the car body, and where all hinges (4,4',6,6') have their axes mutually in parallel and perpendicularly to the longitudinal mean plane of the car and under the same acute angle ($\alpha$) to the horizontal, wherein the hinges (4, 4') mounted in the car body are provided on the forward door post (5) and on the same normal plane to the longitudinal mean plane of the car and which supporting arms (3, 3') are interconnected by means of a stabilizing lever (7), which is articulately mounted on the supporting arms (3, 3') with its pivot points situated along an imagined line parallel to the theoretical connecting lines between the hinges (4, 4' and 6, 6') on the different arms, and which therefore provides a forced guiding between the two supporting arms (3, 3').

11 Claims, 2 Drawing Sheets

PIVOT MECHANISM FOR MOTOR CAR DOORS

BACKGROUND OF THE INVENTION

The present invention refers to a pivot mechanism for motor car doors, e.g. doors of passenger cars.

Nowadays it is traditionally almost only used one type of mechanism for suspending motor car doors, comprising simple, conventional hinges, which have been modified to some extent and which are usually mounted in the side of the forward door opening, and in the forward door edge, respectively, and the opening and closing movements of the door are caused in that the door leaf is allowed to pivot about the common hinge axis.

This is a well-tested solution, which is simple and cheap to manufacture, and which is comparatively reliable. On the other hand it must be established that it is not quite practical for the opening function of the door. As the door is opened, the rear door edge thus will swing out from the side of the car, whereby a space for stepping-in and stepping-out is formed between the rear door edge and the car body. In order to give a reasonable space, guaranteeing fairly free stepping-in and stepping-out, it is required that the door is opened so much that its rear edge is situated about 60 cm outside the side of the car body. Furthermore it is often difficult, not to say impossible, to open the car door so much as required for comfortable stepping-in and stepping-out, due to different obstacles, such as other cars, parked close by in narrow parking lots, or walls and pillars in small villa garages, etcetera.

As an alternative to these conventional door hinges for passenger cars, which thus in the open door position still limit the size of the stepping-in and stepping-out opening, and furthermore require rather big free space along the sides of the car, there are sliding doors of different types, which are used successfully in light transport cars and miniature buses. However this solution is hardly useful for passenger cars, as the mounting of the sliding mechanism and the reciprocating movement of the door leaf are obstructed by the front wheel of the vehicle. For using sliding door leafs it therefore is necessary to let the motion area of the door leaf extend rearwards, and for this reason sliding doors for passenger cars will cause that the car can be made only in a two door version. This is a limitation of the car type, which is not appreciated by everybody. Furthermore it is still difficult to find natural mounting attachments for the sliding mechanisms and it is necessary to design more or less complicated solutions, which mean increase in manufacturing costs and furthermore often make the doors unstable.

Another type of alternative for the common car door hinges are mechanisms, which use pivotable arms, which e.g. often is utilized at buses. In such applications for passenger cars, the position of the front wheels however will limit the usefulness, at the same time as the movement of the door out from the car side remains, and for these reasons, those structures do not constitute any virtual solution of the problem defined.

In U.S. Pat. No. 4 632 447 and U.S. Pat. No. 4 641 881 however, there are described two hinge mechanisms intended for passenger cars and having pivotable arms, which have been adapted for use at passenger cars, but also in these cases the door leaf moves, when opened, a short distance out from the side of the car, at the same time as the size of the door opening is limited.

GB-A-902405 discloses an arm mechanism solution wherein one of the hinges has been provided at a substantial distance from the other for making the system stable, and where the hinge located lowermost is mounted in the middle of the door opening. At opening the lower arm therefore will be a substantial obstacle for stepping-in and stepping-out. The door will also move outwards and this undesired movement can not be eliminated by essentially angling the motion plane for the arms horizontally, as this should mean that the above described problems then should be aggravated to such extent that stepping-in and stepping-out should be rather difficult.

PURPOSE AND MOST ESSENTIAL FEATURES OF THE INVENTION

The purpose of the invention is to provide a hinge mechanism for car doors of the type, which is equipped with pivotable arms and which is designed for eliminating the above described deficits and provide a mechanism, which permits that the door can be opened thus that substantially the entire door opening is exposed without any part of the car door moving more than a short distance outside the side of the car body.

BRIEF DESCRIPTION OF THE DRAWINGS

Hereinafter the invention will be further described with reference to an embodiment illustrated in the accompanying drawings.

DESCRIPTION OF THE PREFERRED EMBODIMENTS

Figure 1:
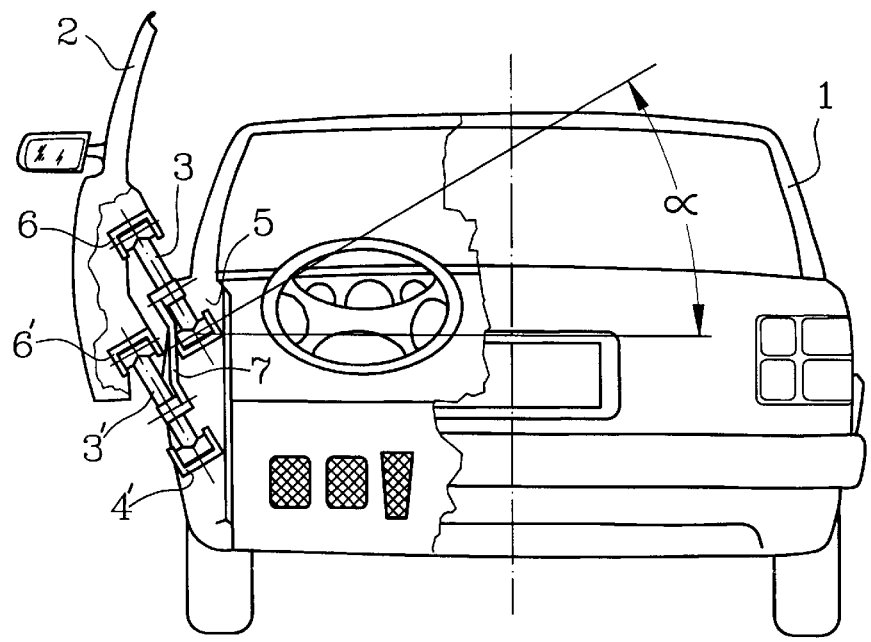
In FIG. 1 is shown in a view from behind a passenger car, partially in a schematical cross section and with the left front door shown in open position.
Figure 2:
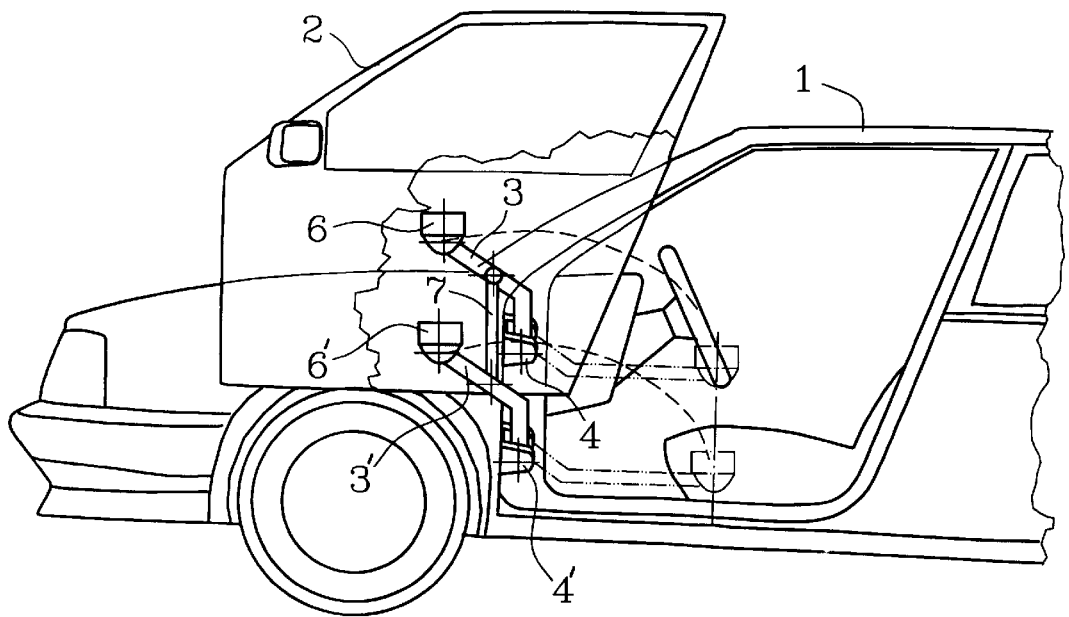
FIG. 2 is a partial view from the left side of the front portion of the car according to FIG. 1.

In FIG. 1 is shown in a schematical view from behind a passenger car 1, whereby the left side is shown in cross-section at a section on level with the front door 2, which is shown in completely open position. The hinge mechanism according to the invention is useful, i.a. in passenger cars for the front doors as well as for the rear doors and it incorporates two arms 3, 3' of substantially the same length, the length of which correspond to about half the length of the door and which are each one at one end articulately connected via a body hinge 4,4' to the forward edge 5 of the door opening at a mutual distance above each other. The opposite end of each arm 3, 3' is articulately connected to a door hinge 6, 6' each, mounted substantially at the middle of the door leaf and at substantially the same mutual distance above each other as the first hinges 4, 4'. All hinges 4,4',6,6' are mounted in angled position thus that their axes, which are situated on a normal plane to the longitudinal medium axis of the car, form an acute angle α with the horizontal plane, and which angle α can amount to about 30°. All hinges are furthermore arranged in parallel with each other. Between the arms 3, 3' is articulately connected a stability lever 7. The stability lever 7 is mounted at both ends on the arms 3, 3', via links 8, 8', thus that it interconnects the two arms. The links 8, 8' can basically be provided anywhere on the arms, but still so, that they always are at the same distance from the associated arm end and therefore the pivot points for the stability lever will always be situated on a first axis, which is parallel to a second axis, which extend along the associated hinges 4, 4' and 6, 6', respectively. This device corresponds to a theoretical mechanism, wherein two dowels are articulately interconnected by means of three additional parallel dowels having a mutual distance from each other. In the case described the arms 3, 3' thus are interconnected by the door post 5, the stability lever 7 and the door 2.

At a short distance from its attachment to the car body fixed hinge 4, 4', each arm 3, 3' is provided with a bend about a line parallel to the hinge axes, thus that each arm is angled between a short portion 3a, 3a' attached to the car body hinge 4 and 4', respectively, and a longer portion 3b, 3b', which is attached to the door hinge 6 and 6', respectively.

In the closed position of the door the two arm portions 3b, 3b', attached to the door hinges lay in parallel to the longitudinal medium axis of the car, whereby one of the arms 3 lays just about in the middle of the vertical direction of the door, whereas the other arm 3' lays at a substantial distance below the first one, i.e. in the vicinity of the lower edge of the door, which means a distance of about 200–300 mm. The hinges are in principle positioned on a vertical door post, which means that the door opening will be optimized, and the lower arm 3', is hidden between the lower edge of the door and the door sill.

As the door is opened, the geometry described causes that the arms will pivot in parallel to each other about the hinges 4, 4', mounted in the car body. Thereby the arms 3, 3' will move in two parallel planes, which are arranged perpendicularly to the hinge axes and are angled against the vertical line. The arms urge the door 2 to move along a path, which is circular in the plane of motion of the arms. This combined movement can be subdivided in three motion directions relative to the car, i.e. forward, upward and outward. As the axes of the hinges are arranged under an angle to the horizontal, the motion plane of the arms will minimize the undesired movement outwards in that the major part of the combined movement is a movement upwards, which motion component is utilized to lift the door leaf above a front wheel which has been obliquely positioned to extreme extent, and which would form an obstacle for opening the door if the door leaf should move at the same level as in its closed position. The distance between the arms, both in vertical and longitudinal direction makes the door always to be in parallel with the car.

Figure 3:
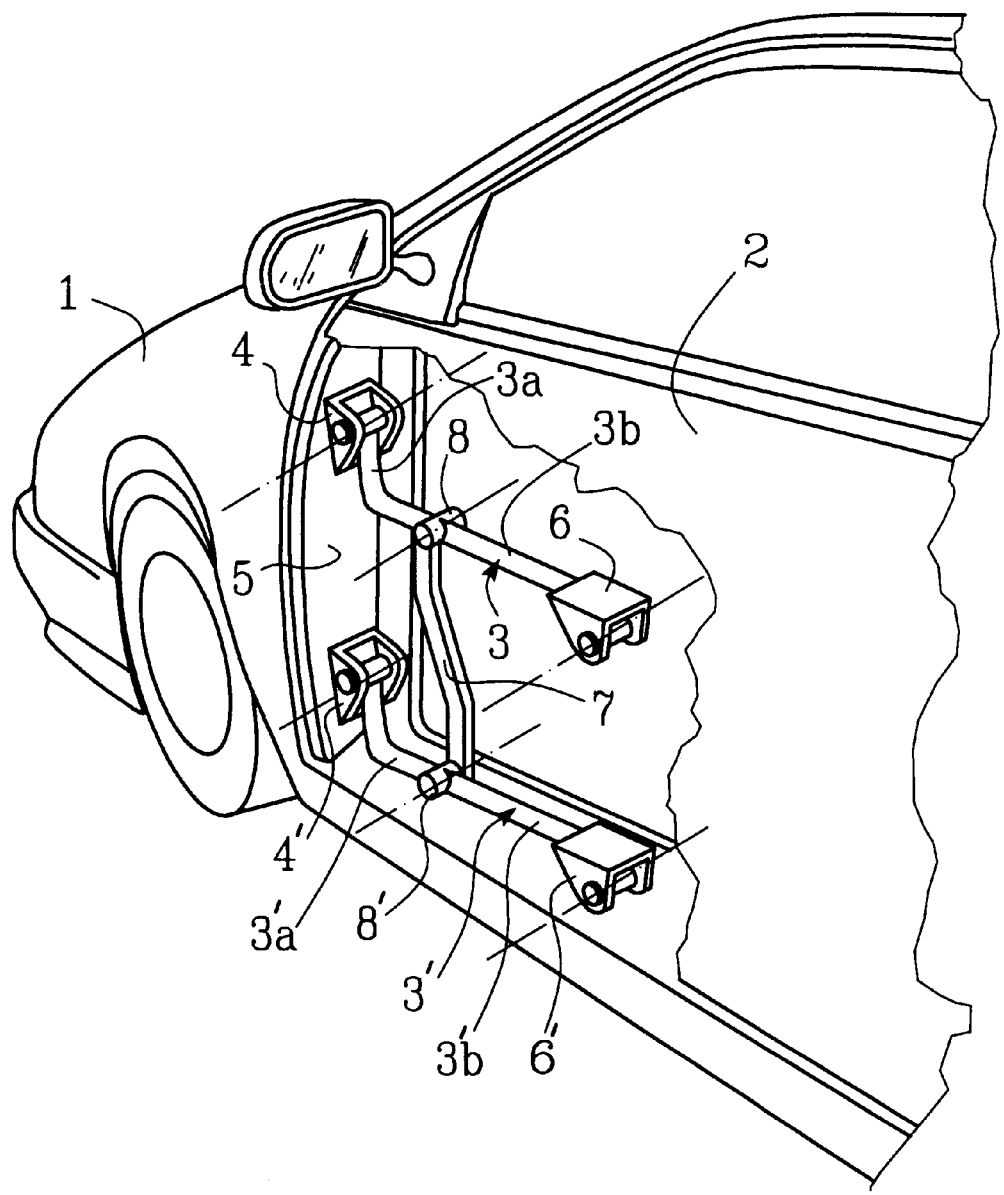
FIG. 3 shows schematically in a view from above the positions of the door leaf in relation to car body and front wheel in completely open position.

In FIG. 3 the mechanism according to the invention is shown in perspective.

For allowing the door to be opened to a maximum extent it is necessary to have the stabilizing lever 7, due to the fact that a mechanism which consisted only of four arms and four links should become unstable when all links are positioned at a common, imagined line. In the embodiment shown, this unstable position would be reached without a stabilizer, as the hinges mounted on the door pass the door post when all four hinges are situated in the same normal plane with reference to the longitudinal mean axis. In this position the arms could happen to get crossed and this would cause the door to tilt, either forward of rearward, which absolutely is unacceptable. In the unstable position the door is only half opened and thereby the space for stepping-in and stepping-out is particularly limited. A stability lever according to the invention causes a forced guidance and therefore the door can be pushed forwards in a stable manner beyond the critical point so far as the other design permits, and to be closed in the same manner, respectively.

The invention is not limited to the embodiment shown in the drawings and described in connection thereto but modifications and variations are possible within the scope of the appended claims.

I claim:

1. A pivoting door mechanism in a motor car having a body with a door frame which includes a forward door post, a door, first and second support arms, each support arm having a proximal end and a distal end, first and second body hinges mounted on the door frame at respective positions which are vertically spaced-apart a given distance, the first and second body hinges being mounted on the respective proximal ends of the first and second support arms for relative pivotal movement about respective first and second inboard pivot axes, first and second door hinges mounted on the door at respective positions which are vertically spaced-apart a distance which is substantially equal to the given distance, the first and second door hinges being mounted on the respective distal ends of the first and second support arms for relative pivotal movement about respective first and second outboard pivot axes, and the inboard and outboard pivot axes are parallel and each axis extends normal to a longitudinal mean plane of the car, each axis also extending in a direction which forms substantially the same acute angle α with a horizontal plane, the door mechanism being characterized in that the body hinges are mounted on the forward door post, the inboard and outboard pivot axes are positioned to lie in a common plane which is normal to the longitudinal axis, the mechanism further comprises a stability lever having first and second ends which are mounted for articulated relative movement on the respective first and second support arms at respective first and second points of articulation, the first and second points of articulation being located along a first axis which is parallel to a second axis that extends between the door hinges whereby the support arms guide the door for stable movement between open and closed positions relative to the door frame as the support arms undergo said relative pivotal movement with respect to the inboard and outboard pivot axes.

2. A pivoting door mechanism as in claim 1 in which the first and second support arms have respective lengths between their proximal and distal ends which are the same.

3. A pivoting door mechanism as in claims 1 in which the first and second support arms are each formed with a bend, each bight being located at a point which is closer to the proximal end than the distal end of the respective support arm.

4. A pivoting door mechanism as in claim 1 in which the first body hinge is located on the forward door post above the second body hinge and the door is guided by the support arms across a middle point of height which is between said open and closed positions, the first support arm having a first portion which is connected to the first door hinge with the first portion being substantially horizontal when the door is at said middle point, and the second support arm has a second portion connected to the second door hinge, said second portion being substantially parallel to the first support arm, said door frame having a lower edge, and said second portion of the second support arm being located just above the lower edge.

5. A pivoting door mechanism as in claim 1 in which the angle α for the hinges against the horizontal plane is about 30 degrees.

6. A pivoting door mechanism as in claims 2 in which the first and second support arms are each formed with a bend, each bight being located at a point which is closer to the proximal end than the distal end of the respective support arm.

7. A pivoting door mechanism as in claim 2 in which the first body hinge is located on the forward door post above the second body hinge and the door is guided by the support arms across a middle point of height which is between said open and closed positions, the first support arm having a first portion which is connected to the first door hinge with the first portion being substantially horizontal when the door is at said middle point, and the second support arm has a second portion connected to the second door hinge, said second portion being substantially parallel to the first support arm, said door frame having a lower edge, and said second portion of the second support arm being located just above the lower edge.

8. A pivoting door mechanism as in claim 3 in which the first body hinge is located on the forward door post above the second body hinge and the door is guided by the support arms across a middle point of height which is between said open and closed positions, the first support arm having a first portion which is connected to the first door hinge with the first portion being substantially horizontal when the door is at said middle point, and the second support arm has a second portion connected to the second door hinge, said second portion being substantially parallel to the first support arm, said door frame having a lower edge, and said second portion of the second support arm being located just above the lower edge.

9. A pivoting door mechanism as in claim 2 in which the first and second support arms have respective lengths between their proximal and distal ends which are the same.

10. A pivoting door mechanism as in claim 3 in which the first and second support arms have respective lengths between their proximal and distal ends which are the same.

11. A pivoting door mechanism as in claim 4 in which the first and second support arms have respective lengths between their proximal and distal ends which are the same.

* * * * *